United States Patent [19]

Golan

[11] Patent Number: 4,557,363
[45] Date of Patent: Dec. 10, 1985

[54] FRICTION COUPLE COOLING SYSTEM RESPONSIVE TO ACTUATION THEREOF

[75] Inventor: Kenneth F. Golan, Pekin, Ill.

[73] Assignee: Caterpillar Tractor Co., Peoria, Ill.

[21] Appl. No.: 560,680

[22] Filed: Dec. 12, 1983

[51] Int. Cl.[4] ............................................. F16D 13/72
[52] U.S. Cl. ............................ 192/113 B; 192/70.12;
192/113 R; 192/3.57; 188/264 E; 188/264 F
[58] Field of Search ............ 192/113 B, 113 R, 70.12,
192/85 AA, 3.57; 188/264 E, 264 F

[56] References Cited

U.S. PATENT DOCUMENTS

| | | | |
|---|---|---|---|
| 2,869,701 | 1/1959 | Yokel | 192/85 |
| 2,941,639 | 6/1960 | Christenson et al. | 192/13 B |
| 3,105,582 | 10/1963 | Ziabicki | 192/113 |
| 3,139,908 | 7/1964 | Strader | 137/625.48 |
| 3,259,216 | 7/1966 | Klaus et al. | 188/264 E |
| 3,300,004 | 1/1967 | Peterson | 192/113 B X |
| 3,773,157 | 11/1973 | Koch, Jr. et al. | 192/113 |
| 3,823,802 | 7/1974 | Winzeler et al. | 192/113 |
| 3,907,052 | 9/1975 | Shaw | 180/6.7 |
| 3,995,727 | 12/1976 | Ivey | 192/113 |
| 4,004,670 | 1/1977 | Nerstad et al. | 192/105 |

Primary Examiner—Samuel Scott
Assistant Examiner—Allen J. Flanigan
Attorney, Agent, or Firm—J. W. Burrows

[57] ABSTRACT

The present cooling system provides a limited flow rate to the clutches during disengagement and provides additional cooling flow to the clutches during partial engagement and controls the pressure level of the fluid from the source of cooling fluid by operation of a valve mechanism which is responsive to a control mechanism. Upon full engagement, the valve mechanism automatically reduces the volume of cooling fluid to the clutches and simultaneously reduces the pressure level of the cooling flow from the source of cooling fluid. This cooling system provides the needed volume of cooling fluid during partial engagement of the clutches and also reduces the volume of cooling fluid during disengagement to reduce drag forces while further reducing the volume of cooling fluid during full engagement to conserve horsepower.

16 Claims, 3 Drawing Figures

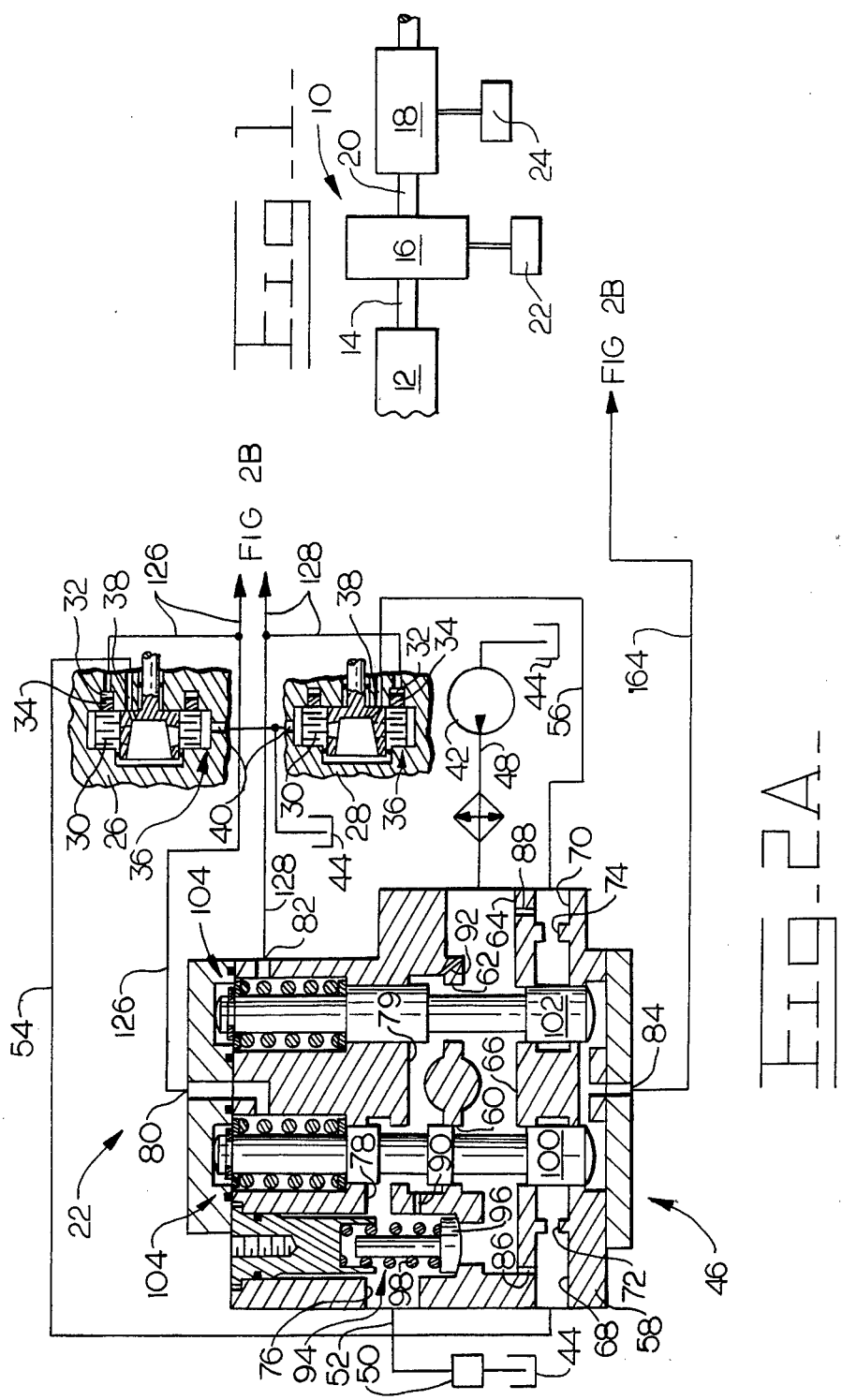

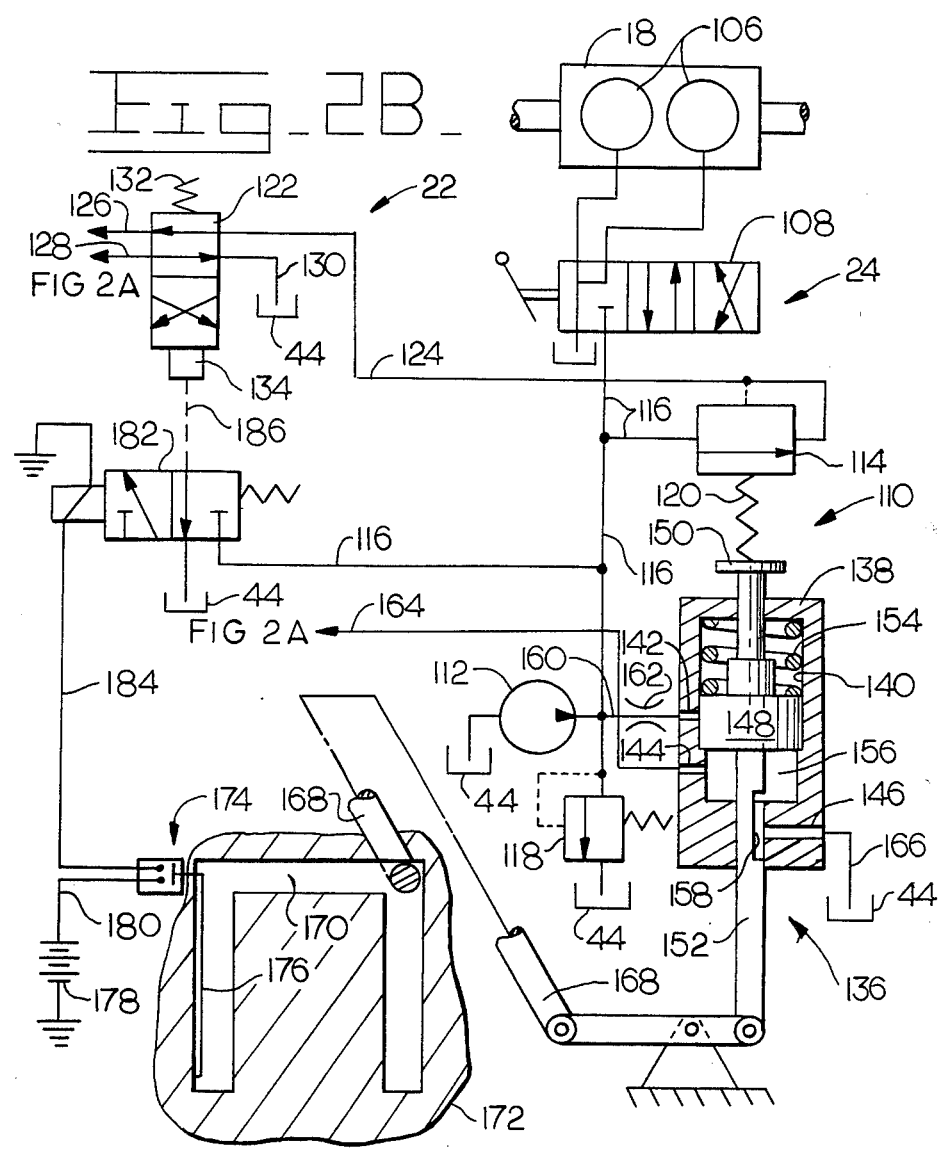

4,557,363

FRICTION COUPLE COOLING SYSTEM RESPONSIVE TO ACTUATION THEREOF

TECHNICAL FIELD

This invention relates generally to a cooling system for a friction couple and more particularly to providing additional cooling flow to the friction couple only during a range of engagement between initial engagement up to full engagement.

BACKGROUND ART

Friction couples normally require some form of cooling to control the heat that is generated during engagement. This is especially important when using friction discs. A standard way of cooling is to direct cooling fluid in varied quantities across the disc. There are various cooling systems known today to supply additional cooling fluid flow to clutches or the like during initial engagement and full engagement while others are provided to reduce the cooling fluid flow or totally shut off the fluid flow during disengagement in order to reduce drag forces. Still others provide ways to increase the pressure of the cooling fluid flow during initial engagement but they either maintain the increased pressure or totally shut off the cooling fluid flow at full engagement.

One of the problems associated with these systems is that too much fluid flow is available during full engagement than is needed for cooling thus using extra horsepower unnecessarily. Another problem is that reducing fluid flow during disengagement alters the ability to provide the extra fluid flow needed for cooling during the initial contacting of the numerous discs while still having the ability to reduce the fluid flow to a lower level upon reaching full engagement.

The present invention is directed to overcoming one or more of the problems as set forth above.

DISCLOSURE OF THE INVENTION

In one aspect of the present invention, a cooling system is provided for cooling a friction couple. The system includes a source of pressurized control fluid, a source of cooling fluid, a fluid pathway through the friction couple and an actuator for actuating the friction couple. A valve means is provided for continuously directing a predetermined volume of fluid to the fluid pathway during disengagement and full engagement of the friction couple. The valve means also controls the pressure of the source of cooling fluid and increases the volume of cooling fluid to the fluid pathway during partial engagement of the friction couple. A control means is also provided for controlling actuation of the friction couple.

The problem of unnecessarily using extra horsepower by providing large flow rates during full engagement of the friction couple is overcome by having a valve means that automatically reduces the fluid flow to the cooling pathway of the friction couple upon full engagement while also reducing the pressure level of the remaining cooling flow. The valve means of this cooling system provides the ability to have a low flow rate and pressure level of fluid being directed to the friction couple for cooling during disengagement, increasing the pressure level and volume of fluid during partial engagement, and reducing the fluid flow and pressure level upon full engagement of the friction couple.

BRIEF DESCRIPTION OF THE DRAWINGS

FIG. 1 is a diagrammatic illustration of a vehicular system in which the subject invention may be used; and FIG. 2A and FIG. 2B collectively illustrate a partial schematic, diagrammatic and cross-sectional portions of the friction couple cooling system of the present invention.

BEST MODE FOR CARRYING OUT THE INVENTION

Referring now to FIG. 1, a vehicle system is generally indicated by the reference numeral 10 and includes an engine 12 having an output shaft 14 drivingly connected to a high-low clutch assembly 16 and a transmission 18 connected to the high-low clutch assembly 16 by a driving member 20. A cooling system 22 is associated with the high-low clutch assembly 16 while transmission controls 24 are connected to the transmission 18 for selectively engaging and disengaging clutches therein.

Referring now to FIG. 2A, the cooling system 22 is shown in greater detail and the transmission 18 and its controls 24 are schematically represented. First and second friction couples, such as clutches 26,28, are diagrammatically illustrated. The first and second clutches 26,28 are located in the high-low clutch assembly 16 to respectively drive the driving member 20. Each of the clutches 26,28 have a plurality of discs 30 which are selectively compressed together to transmit driving force therethrough and released to disengage the driving member by the introduction of or release of pressurized fluid in a pressure chamber 32 which acts on an actuator 34. Each of the clutches 26,28 are operational between a disengaged position, partially engaged positions and full engagement by selective control of the actuator 34. A fluid pathway 36 is provided through each of the clutches 26,28 to pass cooling flow therethrough. The fluid pathway 36 includes an inlet port 38 and an outlet port 40 located at different positions on the clutch 26,28 and adapted to pass fluid therebetween and across the disc 30.

The cooling system 22 includes a source of cooling and lubricating fluid such as a pump 42 which draws fluid from a reservoir 44 and directs the fluid to a valve means 46 through a conduit 48. The valve means 46 controllably passes fluid from the pump 42 to a lubrication system 50 by a conduit 52 and to the fluid pathway 36 of each of the clutches 26,28 by conduits 54,56, respectively.

The valve means 46 includes a housing 58 having first and second bores 60,62 defined therein. An inlet port 64 located in the housing 58 is connected to the conduit 48. an internal passage 66 in the housing 58 freely connects the inlet port 64 with the first and second bores 60,62. First and second outlet ports 68,70 in the housing 58 are respectively connected to the conduits 54,56. Internal passages 72,74 respectively connect the first and second outlet ports 68,70 to the first and second bores 60,62 at a spaced relationship from the internal passage 66. As illustrated in FIG. 2A, the internal passages 72,74 are restricted but it is recognized that the size of the passageways could be controlled in various ways. A third outlet port 76 located in the housing 58 is connected to the conduit 52. An internal passage 78 connects the first bore 60 with the third outlet port 76 and an internal passage 79 connects the first and second bores 60,62 in a spaced relationship to the internal passage 66. First and second control ports 80,82 are located in the housing 58 and respectively connected to one end of the first and second bores 60,62. A third control port 84 in the housing 58 is connected to the other end of both of the first and second bores 60,62. First and second orifices 86,88 are located in the housing 58 between the passage 66 and respective outlet ports 68,70. Third and fourth orifices 90,92 are located in the housing between the first passage 66 and the third outlet port 76.

The valve means 46 further includes a relief valve 94 located in the housing 58 between the first passage 66 and the outlet port 76. The relief valve 94 includes a poppet 96 and a spring 98.

First and second valving elements, such as spools 100 and 102 are respectively located in the first and second bores 60 and 62. Each of the first and second spools are movable between a first, spring biased position at which the internal passage 66 is in open communication with the outlet port 76 through internal passages 78,79 and movable to a second position at which the internal passage 66 is respectively blocked from the outlet port 76 and in open communication with the internal passages 72 and 74.

Spring assemblies 104 are compressibly secured between the housing 58 at the one end of the bores 60,62 and the spools 100,102 to bias the spools to their first positions.

Referring now to FIG. 2B, a plurality of transmission clutches 106 are diagrammatically shown in the transmission 18. Furthermore, a transmission control valve 108 is schematically shown for selectively controlling the operation of the clutches 106.

A control means 110 is provided in the cooling system 22 for controlling actuation of the friction couples 26,28 and the valve means 46. The control means 110 includes a source of pressurized control fluid, such as a pump 112, which draws fluid from the reservoir 44 and delivers pressurized fluid to the transmission control valve 108 and to a variable pressure reducing valve 114 by a pressure conduit 116. A relief valve 118 is connected to the pressure conduit 116 in a well known manner to limit the pressure level in the pressure conduit 116.

The variable pressure reducing valve 114 has a control spring 120 adapted to vary the force on the valve 114 to controllably change the output fluid pressure level from the valve 114. The output of the valve 114 is connected to a switching valve 122 by a conduit 124.

Conduits 126,128 are respectively connected between the first and second control ports 80,82 (FIG. 2A) and the switching valve 122. The switching valve 122 is further connected with the reservoir 44 by a conduit 130. The switching valve 122 is spring biased to a first position by a spring 132 acting on one end of the switching valve 122 and is movable to a second position in response to pressurized fluid being directed to a pressure chamber 134 on the other end of the switching valve 122.

A latching mechanism 136 is operatively associated with the control spring 120. The latching mechanism 136 includes a housing 138 defining a multi-diameter bore 140 therein. An inlet port 142 is located in the housing 138 and intersects the bore 140. An outlet port 144 and a drain port 146 are located in the housing 138 and intersect with the bore 140 at a spaced relationship from the inlet port 142.

A piston 148 is slidably disposed within the bore 140 of the housing 138. The piston 148 has rods 150,152 extending through the housing 138. The rod 150 contacts the control spring 120 and is adapted to change the force of the control spring 120. A spring 154 is disposed at one end of the bore 140 and biases the piston 148 to a first position. A pressure chamber 156 defined by the piston 148 and the housing 138 is located at the other end of the bore 140. A flat 158 is defined on the rod 152 and adapted to selectively communicate the pressure chamber 156 with the drain port 146.

A conduit 160 having an orifice 162 located therein connects the inlet port 142 of the latching mechanism 136 to the pressure conduit 116. A conduit 164 connects the outlet port 144 of the latching mechanism 136 with the third control port 84 of the valve means 46 (FIG. 2A). A conduit 166 connects the drain port 146 of the latching mechanism 136 with the reservoir 44.

The control means 110 further includes an input member 168 connected to the rod 152 of the piston 148. The input member 168 is movably positioned in a U-shaped slot 170 which is suitably formed in a control panel 172.

A sensing element 174 is located on the control panel 172 and positioned relative to one leg of the U-shaped slot 170. The sensing element 174 includes a switch member 176 located in the one leg of the U-shaped member 170 and adapted to contact the input member 168 upon the input member 168 being positioned in the one leg.

The sensing element 174 is connected to a source of electrical energy, such as a battery 178, by an electrical line 180 and to a solenoid operated valve 182 by an electrical line 184. A conduit 186 connects the solenoid operated valve 182 to the pressure chamber 134 of the switching valve 122. The solenoid operated valve 182 is further connected to the pressure conduit 116 and the reservoir 44.

Even though the preferred embodiment uses separate pumps for supplying cooling fluid and control fluid, it is recognized that one pump could be utilized without departing from the essence of the invention.

INDUSTRIAL APPLICABILITY

The cooling system 22 of the present invention is particularly useful in a system having more than one clutch, such as the high and low speed clutches 26,28. It is readily apparent that these clutches could also be forward and reverse clutches or any of the plurality of transmission clutches 106. In this subject cooling system 22, the pump 42 delivers cooling and lubricating fluid to the fluid passageway 36 of the clutch 26 through the internal passage 66, the orifice 86 and the conduit 54. The fluid exhausting from the fluid passageway 36 is directed to the reservoir 44. The cooling fluid for the other clutch 28 is directed from the pump 42 to the fluid passageway 36 through the internal passageway 66 of the valve means 46, the orifice 88, and the conduit 56. The fluid exhausting from the outlet port 40 is also directed to the reservoir 44. The orifices 86 and 88 are sized to provide approximately 24 lpm (6.3 gpm). The remaining portion of the cooling and lubricating fluid from the pump 42 is directed from the internal passage 66 to the lubricating system 50 across the spools 100,102, through the internal passages 78,79 and the conduit 52. The fluid from the lubricating system 50 is returned to the reservoir 44 in a conventional manner. The above noted quantity of cooling fluid to the clutches 26,28 continues as long as the clutches 26,28 are disengaged. The resistance to flow of the fluid from the pump 42 through the valve means 46, the lubricating system 50 and the fluid pathways 36 is controlled primarily by the lubricating system 50 and is very low, for example on the order of 140 kPa (20 psi). The quantity of flow to the clutches 26,28 is sufficiently low to offset any deficiencies from fluid drag of the fluid within the clutches while still maintaining sufficient cooling and lubricating characteristics during the disengaged condition.

With the input member 168 in the position shown in FIG. 2B, the rod 150 of the latching mechanism 136 is in the position at which the control spring 120 of the variable pressure reducing valve 114 is in its minimum force condition. Consequently, the pressurized fluid from the pump 112 is blocked at the inlet port of the variable pressure reducing valve 114 since the downstream pressure is acting against the minimum spring force as dictated by the control spring 120. The small amount of pressure downstream of the variable pressure reducing valve 114 in the conduit 124 is not sufficient to actuate either of the clutches 26,28.

Furthermore, with the input member 168 in the position shown the switching valve 122 is in its first position, as shown, wherein the conduit 124 is in communication with the conduit 126 to direct the pressurized fluid from conduit 124 to the control chamber 32 of the clutch 26 and simultaneously to one end of the spool 100 through the control inlet port 80. The low pressure level in the conduit 126 acting on the one end of the spool 100 is insufficient to bias the spool 100 against the force of the spring assembly 104.

With the piston 148 of the latching mechanism 136 in its first, spring bias position, the inlet port 142 is blocked by the piston 148. The outlet port 144 which is connected to the other end of the spools 100,102 through the conduit 164 is in open communication with the reservoir 44 through the flat 158 on the rod 152 and the drain port 146.

Upon the input member 168 being moved into one of the legs of the U-shaped slot 170, for example the right leg as shown in FIG. 2B, the piston 148 is progressively moved against the bias of the spring 154 resulting in the rod 150 increasing the force on the control spring 120. Once the input member 168 is moved to the extreme position in the right leg of the U-shaped slot 170, the maximum force is applied to the control spring 120.

As the force on the control spring 120 increases from the movement of the above mentioned input member 168, there is a corresponding increase in the fluid pressure in the conduit 124 downstream of the variable pressure reducing valve 114. This increasing pressure level is simultaneously directed through the switching valve 122 and the conduit 126 to the actuating chamber 32 of the clutch 26 and the one end of the spool 100 in the valve means 46. The biasing force of the spring assembly 104 is sufficiently low that the spool 100 moves from its first, spring biased position to its second position with a relatively low increase in the pressure of the fluid in the conduit 126.

At the second position of the spool 100, the communication of the cooling fluid in the internal passage 66 across the spool is blocked from the third outlet port 76 and in communication with the first outlet port 68 through the internal passage 72. However, the orifice 90 ensures a minimum flow of fluid to the lubrication system 50 prior to opening of the relief valve 94 by communicating fluid therethrough to the outlet port 76 from the passage 66. The internal passage 72 is of a controlled size sufficient to restrict the fluid flow therethrough. Since the internal passage 66 is blocked from the outlet port 76 by the spool 100 and the internal passage 72 restricts the fluid flow from the communication with the internal passage 66, the fluid pressure in the internal passage 66 increases. The resulting increase in pressure increases the quantity of fluid flow being directed through the internal passage 72 to the fluid pathway 36 as a result of the larger differential pressure being generated across the internal passage 72. Once the pressure increases to approximately 310 kPa (45 psi) the poppet 96 of the relief valve 94 moves against the bias of the spring 98 allowing the excess fluid flow in the internal passage 66 to pass thereacross to the third outlet port 76 and to the lubrication system 50. With the increased pressure level of the fluid in the internal passage 66 and the controlled size of the internal passage 72, an additional volume of cooling fluid on the order of 76 lpm (20 gpm) is directed to the outlet port 68. This additional volume of fluid combines with the fluid being passed across the orifice 86 and collectively passes to the fluid pathway 36 of the clutch 26. It is recognized that there is an increase of fluid flow across the orifice 86 as a result of the increase in pressure. The combined volumes of cooling fluid flow continues to pass through the fluid pathway 36 of the clutch 26 during the increase of the pressure level in the conduit 126 which is progressively acting on the actuator 34 to fully engage the disc 30 of the clutch 26. With the clutch 26 fully engaged, the transmission control valve 108 selectively controls the operating speed of the vehicle, not shown, by energizing one of the respective clutches 106 in the transmission 18.

As the piston 148 reaches its second position, the communication of the pressure chamber 156 with the drain port 146 is interrupted and communication between the inlet port 142 and the pressure chamber 156 is opened. As the pressurized fluid from the source 112 enters the pressure chamber 156, sufficient force is generated to hold the piston 148 against the bias of the spring 154 thus allowing the operator to release his force on input member 168. Simultaneously, the pressure build up in pressure chamber 156 is directed to the other end of the spools 100,102 through the conduit 164 and the third control port 84.

As previously indicated the maximum force on the control spring 120 of the variable pressure reducing valve 114 is the greatest when the piston 148 is in its second position. Consequently, the maximum available pressure in the conduit 124 is reached at the time the control spring 120 reaches its maximum force level. The pressure level in the pressure chamber 156 is likewise increased with the piston 148 in its second position. The pressure level in the other end of the bores 60,62 acting on the spool 100 increases and biases the spool 100 in conjunction with the force of the spring member 104 to its first position. At the first position, the additional fluid flow is blocked from the fluid pathway 36 and the pressure level of the fluid in the internal passage 66 is again reduced to the lower pressure level of 140 kPa. At this position of the piston 148 and the control spool 100 returned to its first position, the clutch 26 is fully engaged. This condition of operation will continue until the input member 168 is moved away from its extreme position. Limited movement of the input member 168 from its extreme position causes a resulting movement of the rod 152 thus blocking the inlet port 142 and communicating the pressure chamber 156 with the drain port 146 through the flat 158 which is located on the rod 152. Upon the communication of the pressure chamber 156 with the drain port 146, the spring 154 moves the piston 148 back to its first position thus moving the input member 168 to its original position, as shown, at the base of the U-shaped slot 170. Simultaneously therewith, the force on the control spring 120 of the variable pressure reducing valve 114 is relaxed to its minimum force level thus reducing the pressure level in the conduits 124, 126 and the pressure chamber 32 to disengage the disc of the clutch 26.

By moving the input member 168 into the other leg of the U-shaped slot 170, the second clutch 28 is conditioned for actuation. With the input member 168 in the other leg, the switch member 176 is moved into a position to connect the battery 178 with the solenoid operated valve 182. Actuation of the solenoid operated valve 182 connects the pressure conduit 116 with the pressure chamber 134 of the switching valve 122 through the conduit 186. The introduction of the pressurized fluid into the pressure chamber 134 moves the switching valve 122 to the second position thus communicating the conduit 124 with the conduit 128 while connecting the conduit 126 to the reservoir 44 through the conduit 130.

Movement of the input member 168 toward the extreme position in the left leg of the U-shaped slot 170, as shown in the drawing, actuates the clutch 28 in the same manner as movement of the input member in the right leg of the U-shaped slot 170 caused actuation of the clutch 26. In this operating condition, the pressurized fluid in the conduit 128 produces engagement of the clutch 28 and furthermore produces movement of the spool 102 from its first position to its second position. In the second position of the spool 102, the additional volume of cooling fluid is directed to the fluid pathway 36 of the clutch 28 through the controlled internal passage 74, the second outlet port 70 and the conduit 56. The additional volume of cooling fluid at the outlet port 70 combines with the fluid conducted through the orifice 88. At the second position of the spool 102 the communication between the internal passage 66 and the outlet port 76 is blocked by the spool 102 thus increasing the pressure level of the fluid in the internal passage 66 to 310 kPa. The orifice 92 ensures a minimum flow of fluid to the lubrication system 50 whenever the spool 102 is in the second position prior to the opening of the relief valve 94. All excess fluid then passes from the internal passage 66 to the third outlet port 76 across the relief valve 94. The increased pressure in the internal passage 66 and the additional flow through the internal passage 74 coupled with the flow across orifice 88 continues until the clutch 28 is fully engaged. Full engagement of the clutch 28 is accomplished upon the piston 148 reaching its second position which relates to the maximum force on the control spring 120 of the variable pressure reducing valve 114. At this position of the piston 148 pressurized fluid from the pump 112 is directed through the pressure chamber 156 into the other end of the spool 102 moving it back to its first position thus blocking the additional volume of cooling fluid flow through the passage 74 to the fluid pathway 36 and reducing the pressure of the fluid in the internal passage 66. This condition of operation continues as previously indicated until the input member 168 is moved away from its extreme position in the left leg of the U-shaped slot.

In view of the foregoing, it is readily apparent that the cooling system of the present invention provides a small volume of cooling fluid to a clutch during disengagement while increasing the volume of fluid to the clutches while the clutches are being engaged and subsequently decreasing the volume of fluid once the clutch has been fully engaged. By having the valve means and the control means associated therewith, the additional cooling flow can be provided to the clutch and still reduce the additional volume once the clutch has been fully engaged to reduce additional horsepower use and clutch drag forces.

Other aspects, objects and advantages of this invention can be obtained from a study of the drawings, the disclosure and the appended claims.

I claim:

1. In a friction couple cooling system including a source of pressurized control fluid, a source of cooling fluid, a fluid pathway through the friction couple, and an actuator for actuating the friction couple, the improvement comprising:
    valve means for continuously directing a predetermined volume of cooling fluid to said fluid pathway during disengagement and full engagement of the friction couple and for increasing the pressure of the cooling fluid delivered to said fluid pathway and increasing the volume of cooling fluid to said fluid pathway only during partial engagement of said friction couple, and
    control means for controlling actuation of said friction couple and for controlling actuation of said valve means during partial engagement of said friciton couple.

2. The cooling system, as set forth in claim 1, wherein said control means includes a variable pressure reducing valve connected to said source of pressurized control fluid, a latching mechanism associated with the variable pressure reducing valve and adapted to vary the operating pressure of the reducing valve in response to movement of the latching mechanism.

3. The cooling system, as set forth in claim 2, wherein said latching mechanism includes a housing defining a bore therein, a piston slidably disposed in the bore, the piston having rods extending through the housing with one rod at one end of the piston contacting a control spring of the pressure reducing valve, the piston being movable between a first, spring biased position at which said control spring of said reducing valve is at a minimum force and a second position at which said control spring is at a maximum force, and a pressure chamber being defined in the bore at the other end of the piston and being adapted to communicate with the source of pressurized control fluid at the second position of the piston to hold the piston at said second position.

4. The cooling system, as set forth in claim 1, wherein said valve means includes a relief valve adapted to control the pressure of the fluid from the source of cooling fluid in response to said friction couple being operated during said partial engagement.

5. The cooling system, as set forth in claim 4, wherein said valve means includes a valving element movable between a first, spring biased position at which said increased volume of fluid to said fluid pathway is blocked and a second position at which said increased volume of fluid is passed therethrough, said valving element being movable to said second position in response to said friction couple being operated during said partial engagement.

6. The cooling system, as set forth in claim 5, wherein said cooling system includes a second friction couple adapted to operate between disengagement, partial engagement, and full engagement and having a fluid pathway therethrough, and said valve means includes a second valving element movable between a first, spring biased position at which said increased volume of fluid to the fluid pathway of the second friction couple is blocked and a second position at which said increased volume of fluid is passed therethrough, said second valving element being movable to said second position in response to said second friction couple being operated only during said partial engagement.

7. The cooling system, as set forth in claim 6, wherein said control means includes a variable pressure reducing valve connected to said source of pressurized control fluid, a latching mechanism operatively associated with the variable pressure reducing valve and adapted to vary the operating pressure of the reducing valve in response to movement of the latching mechanism.

8. The cooling system, as set forth in claim 7, wherein said latching mechanism includes a housing defining a bore therein, a piston slidably disposed in the bore, the piston having rods extending through the housing with one rod at one end of the piston contacting a control spring of the pressure reducing valve, the piston being movable between a first, spring biased position at which said control spring of said reducing valve is at a minimum force and a second position at which said control spring is at a maximum force, and a pressure chamber being defined in the bore at the other end of the piston and being adapted to communicate with the source of pressurized control fluid at the second position of the piston to hold the piston at said second position.

9. The cooling system, as set forth in claim 8, wherein the control means includes an input member connected to the other rod of the piston of the latching mechanism and a switching valve adapted to selectively direct the pressurized fluid from the pressure reducing valve to the first and second valving elements, said switching valve being movable in response to the operating position of said input member.

10. The cooling system, as set forth in claim 9, wherein the control means includes a conduit connected between the pressure chamber of the latching mechanism and the first and second valving elements of the valve means and adapted to communicate pressurized control fluid from the pressure chamber to the first and second valving elements when said piston of the latching mechanism is at said second position.

11. The cooling system as set forth in claim 10, including a lubrication system connected to said valve means, and wherein said valve means includes a housing having first and second bores defined therein, an inlet port in communication with the first and second bores and connected to the source of cooling fluid, first and second outlet ports respectively in communication with the first and second bores and connected to said fluid pathways of said first and second friction couples, a third outlet port in communication with the first and second bores and connected to said lubrication system, first and second control ports respectively connected to one end of each of the bores and to the switching valve, and a third control port connected to the other end of each of the bores and to the pressure chamber by said conduit, said first and second valving elements being slidably disposed in the respective first and second bores.

12. The cooling system, as set forth in claim 11, wherein the cooling system is adapted for use in a vehicle having an engine, a high-low clutch assembly having the friction couples located therein and a transmission having clutches and controls therefor, said transmission controls being connected to said source of pressurized control fluid, and said first and second valving elements being further biased to their first position in response to either of the friction couples being fully engaged.

13. The cooling system, as set forth in claim 12, wherein the control means includes a conduit connected between the pressure chamber of the latching mechanism and the first and second valving elements of the valve means and adapted to communicate pressurized control fluid from the pressure chamber to the first and second valving elements when said piston of the latching mechanism is at said second position.

14. The cooling system, as set forth in claim 13, including a control panel defining a U-shaped slot, an input member connected to the other rod of the piston of the latching mechanism and being movably positioned in said slot and movement of the input member in each of the legs of the U-shaped slot controls the movement of the piston of the latching mechanism.

15. The cooling system, as set forth in claim 14, including a sensing element located in one of the legs of the U-shaped slot and adapted to actuate said switching valve in response to movement of the input member within the one leg of the U-shaped slot.

16. The cooling system, as set forth in claim 15, including a solenoid operated valve connected between the source of pressurized control fluid and the switching valve and being movable to a position to actuate the switching valve in response to the input member being operated within the one leg of the U-shaped slot.

* * * * *